US008867773B2

(12) United States Patent
Kimura et al.

(10) Patent No.: US 8,867,773 B2
(45) Date of Patent: Oct. 21, 2014

(54) AUDIO PROCESSING DEVICE

(75) Inventors: Masafumi Kimura, Kawasaki (JP); Fumihiro Kajimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 13/516,018

(22) PCT Filed: Dec. 8, 2010

(86) PCT No.: PCT/JP2010/007145
§ 371 (c)(1), (2), (4) Date: Jun. 14, 2012

(87) PCT Pub. No.: WO2011/074212
PCT Pub. Date: Jun. 23, 2011

(65) Prior Publication Data

US 2012/0257779 A1 Oct. 11, 2012

(30) Foreign Application Priority Data

Dec. 15, 2009 (JP) ................................ 2009-284576

(51) Int. Cl.

| | |
|---|---|
| ***H04R 25/00*** | (2006.01) |
| ***H04R 3/00*** | (2006.01) |
| ***H04N 5/225*** | (2006.01) |
| ***H04R 1/08*** | (2006.01) |

(52) U.S. Cl.
CPC ................ *H04N 5/225* (2013.01); *H04R 3/00* (2013.01); *H04R 2410/07* (2013.01); *H04R 1/086* (2013.01)
USPC .............................. 381/359; 381/92; 381/361

(58) Field of Classification Search
CPC ........ H04R 1/083; H04R 1/086; H04R 1/406; H04R 1/342; H04R 25/407; H04R 2201/403; H04R 2410/07; H04R 3/005
USPC ............ 381/91, 92, 94.1, 122, 355, 359, 360, 381/361, 189, 368
See application file for complete search history.

(56) References Cited

U.S. PATENT DOCUMENTS

| | | | | |
|---|---|---|---|---|
| 4,420,655 | A | 12/1983 | Suzuki | |
| 2009/0046882 | A1 * | 2/2009 | Sakurai et al. | 381/359 |
| 2009/0175466 | A1 | 7/2009 | Elko et al. | |
| 2010/0208930 | A1 * | 8/2010 | Kopnov et al. | 381/359 |

FOREIGN PATENT DOCUMENTS

| | | | |
|---|---|---|---|
| CN | 1838838 | A | 9/2006 |
| CN | 101166490 | A | 4/2008 |
| CN | 101185370 | A | 5/2008 |
| CN | 101356849 | A | 1/2009 |
| CN | 101444107 | A | 5/2009 |
| JP | 01-039194 | A | 2/1989 |

(Continued)

*Primary Examiner* — Huyen D Le

(74) *Attorney, Agent, or Firm* — Canon USA, Inc. IP Division

(57) ABSTRACT

An audio processing device including a first audio collecting unit configured to convert an audio vibration into an electric signal and acquire an audio signal includes a shielding unit having a predetermined resonant frequency that shields the first audio collecting unit from an influence of airflow outside the device; and an acquiring unit configured to acquire, as a first audio signal, an audio signal in a predetermined frequency band lower than the resonant frequency of the shielding unit from among the audio signal acquired by the first audio collecting unit that is shielded from the influence of the air flow outside the device by the shielding unit.

18 Claims, 14 Drawing Sheets

(56) References Cited

FOREIGN PATENT DOCUMENTS

| | | | |
|---|---|---|---|
| JP | H03-219798 | A | 9/1991 |
| JP | H06-351092 | A | 12/1994 |
| JP | 09-065482 | A | 3/1997 |
| JP | 2000-046637 | A | 2/2000 |
| JP | 2004-328231 | A | 11/2004 |
| JP | 2005-252575 | A | 9/2005 |
| JP | 2009-537087 | A | 10/2009 |
| WO | 2008004568 | A1 | 1/2008 |

* cited by examiner

AUDIO PROCESSING DEVICE

TECHNICAL FIELD

The present invention relates to an audio processing device and more particularly to an audio processing device that can process an audio signal acquired by a microphone arranged in the device.

BACKGROUND ART

Conventionally, an image pickup apparatus has a function that processes an audio signal. Such an image pickup apparatus generates audio data by processing an audio signal acquired by a microphone arranged in the apparatus and records the audio data together with movie data. With this image pickup apparatus, if wind directly hits the microphone, a turbulent flow is generated on the surface of the microphone. The influence of a pressure variation of the turbulent flow causes a diaphragm of the microphone to irregularly vibrate. Hence, the microphone may record a wind noise.

To address this, for example, Japanese Patent Laid-Open No. 2004-328231 discloses a technique that reduces wind arriving at the microphone from the outside by a sheet-like screen made of polyurethane foam, cloth, or a wire mesh having air permeability, and hence reduces the turbulent flow generated on the surface of the microphone. The use of the material having the air permeability allows a pressure variation of the air (normal audio vibration) that propagates through the air to arrive at the microphone.

The conventional technique uses the sheet having the air permeability to allow the pressure variation of the air (normal audio vibration) that propagates through the air to arrive at the microphone. The wind that arrives at the microphone can be reduced by a certain degree; however, the remaining wind may still cause a turbulent flow to be generated. A noise resulted from the influence of the wind noise is hardly reduced.

Accordingly, the present invention provides an audio processing device that can effectively reduce a wind noise by shielding a microphone from wind to prevent the wind from arriving at the microphone.

CITATION LIST

Patent Literature

PTL 1: Japanese Patent Laid-Open No. 2004-328231

SUMMARY OF INVENTION

An audio processing device including a first audio collecting unit configured to convert an audio vibration into an electric signal and acquire an audio signal according to an aspect of the present invention includes a shielding unit having a predetermined resonant frequency that shields the first audio collecting unit from an influence of airflow outside the device; and an acquiring unit configured to acquire, as a first audio signal, an audio signal in a predetermined frequency band lower than the resonant frequency of the shielding unit from among the audio signal acquired by the first audio collecting unit that is shielded from the influence of the air flow outside the device by the shielding unit.

With the aspect of the present invention, by processing the audio signal from the first audio collecting unit provided with the shielding unit configured to block the air from flowing to the surface of the first audio collecting unit, the audio signal with the effectively reduced noise due to the influence of the wind can be acquired.

Further features and advantages of the present invention will become apparent from the following description of the embodiments with reference to the attached drawings.

DESCRIPTION OF EMBODIMENTS

The embodiments will be described with reference to the drawings.

First Embodiment

An embodiment of the present invention will be described in detail below with reference to the drawings; however, the present invention is not limited to the embodiment. The embodiment of the invention merely provides a desirable embodiment, and does not intend to limit the scope of the invention.

Explanation for Configuration of Image Pickup Apparatus

Described in this embodiment is an image pickup apparatus that can perform processing for reducing a wind noise included in an audio signal acquired by a microphone, as an example of an audio processing device.

Figure 1:
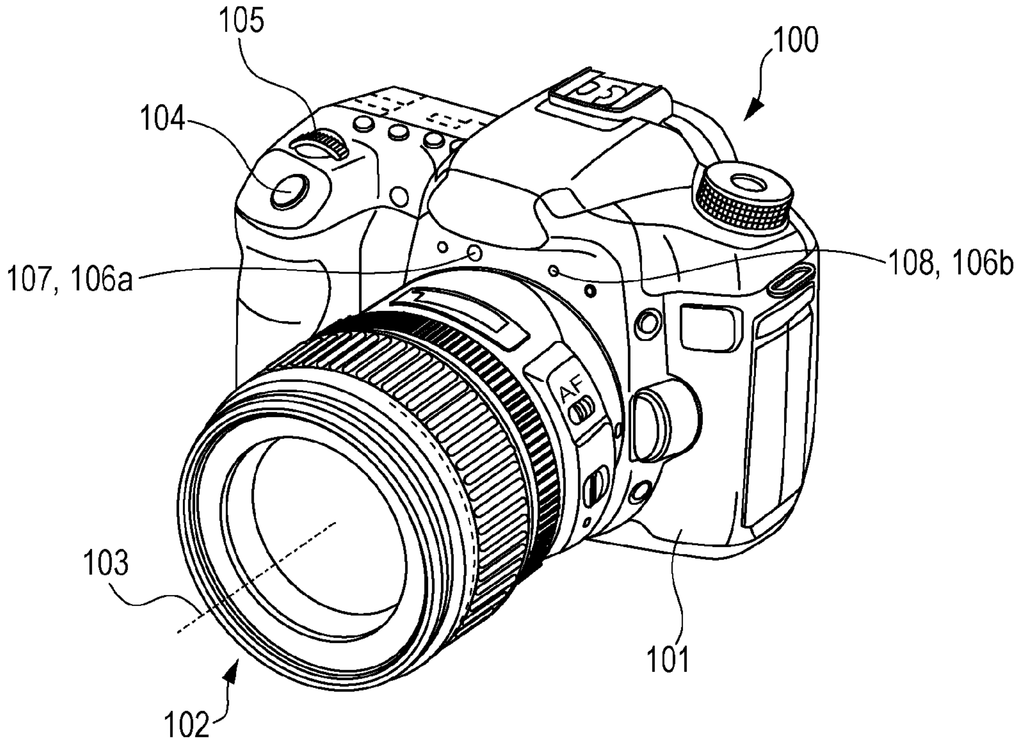
FIG. 1 is an external view of an image pickup apparatus according to a first embodiment.

FIG. 1 is an external view of the image pickup apparatus according to this embodiment.

An image pickup apparatus 100 shown in FIG. 1 will be described below. The image pickup apparatus 100 includes a casing 101, and an image taking lens 102 mounted on the image pickup apparatus 100. The image taking lens 102 takes an image of an object located in a direction along a lens optical-axis 103 thereof (in an image-taking direction). The image pickup apparatus 100 also includes a button 104 that instructs the start and end of the image taking, and an operation button 105 that instructs image-taking mode and setting for the image pickup apparatus 100.

The image pickup apparatus 100 of this embodiment includes a substantially non-directional microphone 106*a* (first audio collecting unit or first microphone) and a microphone 106*b* (second audio collecting unit or second microphone). The microphone 106*a* is provided inside an opening 107 (in a direction toward the inside of the casing 101). The opening 107 is provided at the casing 101. The microphone 106*b* is provided inside an elastic member 108 (in a direction toward the inside of the casing 101). The elastic member 108 is provided at the casing 101 and made of a resin film.

The image pickup apparatus 100 according to this embodiment generates movie data from an optical image of an object acquired through the image taking lens 102, generates audio data by processing audio signals acquired by the microphones 106*a* and 106*b*, associates the movie data and the audio data with each other, and records the associated data.

In this embodiment, the elastic member 108 is arranged between the outside of the casing 101 and the microphone 106*b*, to prevent the unwanted air around the surface of the microphone 106*b* from flowing into the microphone 106*b* by the wind passing along the surface of the casing 101. The elastic member 108 serves as a division wall that blocks and shields the surface of the microphone 106*b* from the outside of the casing 101 so that the air on the surface of the microphone 106*b* does not move due to, for example, a wind pressure. Accordingly, the phenomenon, in which the wind directly hits the microphone 106*b*, the turbulent flow is generated around the surface of the microphone 106*b* because the air outside the apparatus moves (i.e., wind is blown), and hence the pressure varies, is prevented from occurring. However, a vibration generated due to a factor other than the wind (a vibration due to a sound of an object but not a noise) has to be transmitted to the surface of the microphone 106*b* as a vibration. In this embodiment, the elastic member 108 is used as the division wall. The elastic member 108 is made of, for example, a resin film as a material that resonates with an audio vibration. Accordingly, the vibration of the elastic member 108 vibrates the air between the microphone 106*b* and the elastic member 108, so that the vibration due to the sound of the object indirectly propagates to the surface of the microphone 106*b*.

In short, with the conventional technique, for example, a material with holes each having a diameter of about 500 micrometers is used to allow the audio vibration to propagate to the microphone and hence not to eliminate the airflow. However, with this technique, the wind arrives at the surface of the microphone, and the turbulent flow is generated. In light of the situation, in this embodiment, the surface of the microphone 106*b* is shielded from the influence of the wind outside the casing 101. Also, the elastic member 108 is provided at the aforementioned position so that the vibration due to, for example, the sound of the object can propagate to the surface of the microphone 106*b*. For example, the material of the elastic member 108 is desirably a resin film (polyimide) or a film formed by extending cellulose. Instead of these materials, any material may be used as long as a similar characteristic can be acquired. Alternatively, the material may be an elastic member made of a porous material that can markedly reduce the airflow rate. For example, as long as the porous material has micropores with a diameter in a range from about 0.1 to 2.0 micrometers, the airflow rate of the microphone can be substantially eliminated even if the wind hits the microphone.

Figure 2:
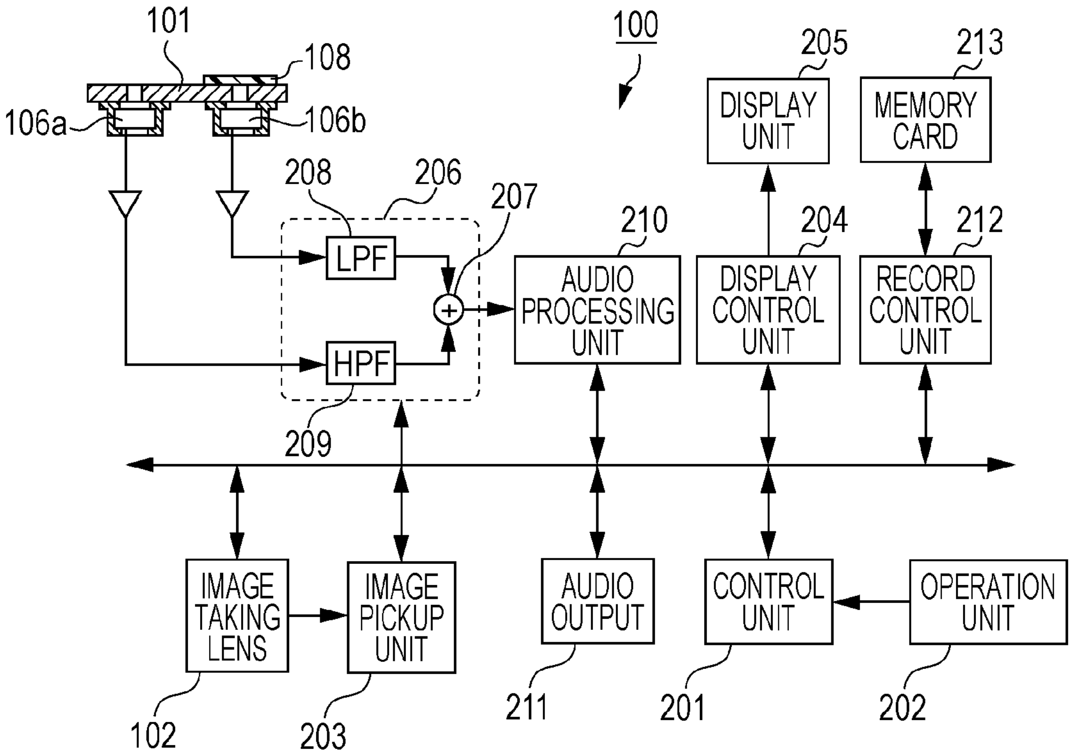
FIG. 2 is a functional block diagram of the image pickup apparatus according to the first embodiment.

Next, the configuration and operation of the image pickup apparatus 100 according to this embodiment will be described with reference to FIGS. 2 and 3A to 3F. FIG. 2 is a block diagram schematically showing the configuration and function of the image pickup apparatus 100 according to this embodiment. FIGS. 3A to 3D illustrate frequency characteristics of respective microphones.

In FIG. 2, the same reference signs are assigned to the same components shown in FIG. 1, and the redundant description will be omitted. Referring to FIG. 2, a control unit 201 controls the entire image pickup apparatus 100. An operation unit 202 receives an operation by a user and sends a control signal to the control unit 201. The operation unit 202 includes the button 104 and the operation button 105 shown in FIG. 1. An image pickup unit 203 converts an optical image of an object acquired through the image taking lens 102 into an electric signal, converts the electric signal into image data with an image format that is required for recording, and outputs the image data. A display control unit 204 causes a display unit 205 to display an image acquired from the image pickup unit 203 and a screen that is generated by the control unit 201 in accordance with an operation by the user.

As describer above, the opening 107 is formed in front of the microphone 106*a*, and the elastic member 108 made of, for example, a resin film is arranged in front of the microphone 106*b*. An audio acquiring unit 206 includes a combining unit 207 that combines the audio signals acquired by the microphones 106*a* and 106*b* with each other, and filters 208 and 209 that extract signals of frequency bands within specific ranges of the audio signals acquired by the microphones 106*a* and 106*b*. In this embodiment, to extract the signals of the frequency bands within the specific ranges, a low pass filter (LPF) 208 and a high pass filter (HPF) 209 are used. Alternatively, other filters, such as band-pass filters or notch filters may be used. The specific frequency bands extracted by the low pass filter 208 and the high pass filter 209 will be described in detail below with reference to FIGS. 3A to 3F. The specific frequency band extracted by the low pass filter

208 is a predetermined frequency band or lower. A frequency arranged at the boundary between a frequency band to be extracted and a frequency band not to be extracted is generally called cutoff frequency. Similarly, a cutoff frequency of the high pass filter 209 is a frequency at the boundary between a frequency band to be extracted and a frequency band not to be extracted. These filters typically have the frequency bands to be extracted, the frequency bands which are defined by the cutoff frequencies. That is, the low pass filter is a first extracting unit that extracts a first frequency band, and the high pass filter is a second extracting unit that extracts a second frequency band.

The control unit 201 can turn ON and OFF the operations of the filters 208 and 209, and the combining unit 207 as required. Also, the control unit 201 can change filter coefficients of the filters 208 and 209, and adjust a ratio of combination.

An audio processing unit 210 optimizes the level of the audio signal acquired by the audio acquiring unit 206. Also, the audio processing unit 210 converts the acquired audio signal into a signal with a format suitable for recording and outputs the converted signal. An audio output unit 211 reproduces the audio signal acquired by the audio processing unit 210 and outputs the signal to an external terminal or a speaker.

A record control unit 212 records image data and audio data acquired by the image pickup unit 203 and the audio processing unit 210 in a memory card 213 if the operation unit 202 instructs the start of recording.

The normal operation of the image pickup apparatus 100 according to this embodiment will be described below.

The power of the image pickup apparatus 100 is turned ON if the user operates the operation unit 202. When the power is turned ON, a power supply unit (not shown) supplies respective blocks of the image pickup apparatus 100 with electric power.

Then, if the user operates the operation unit 202 and gives an instruction to change the mode to a recording mode, the control unit 201 gives an instruction to the respective blocks in the image pickup apparatus 100 for preparation of recording (in this state, the image pickup apparatus 100 is in an "image-taking standby state"). Then, the image pickup unit 203 starts an operation for converting an optical image of an object input from the image taking lens 102 into an electric signal. The display control unit 204 controls the display unit 205 to display an image acquired by the image pickup unit 203. The sound is acquired such that the audio acquiring unit 206 extracts audio signals in the specific frequency bands from the audio signals acquired by the microphones 106*a* and 106*b*, and the audio processing unit 210 processes the extracted audio signals. Then, the sound of the input audio signals is output from the external terminal or the speaker of the audio output unit 211.

The user operates the operation unit 202 to perform image-quality setting and processing setting while the user checks the image displayed on the display unit 205. The user also adjusts the volume of the recorded sound while the user hears the sound output from a speaker that is connected with the audio output unit 211.

When the user operates the button 104 of the operation unit 202, the control unit 201 controls the respective blocks to start the recording start processing (with this operation, the image pickup apparatus 100 is brought into an "image taking state").

If a movie is taken, the record control unit 212 is controlled such that an image signal acquired by the image pickup unit 203 and an audio signal acquired by the audio processing unit 210 are successively recorded in the memory card 213. Then, the recording is stopped if the button 104 is operated again. When the acquired image signal and audio signal have been recorded in the memory card 213, the state is changed to a recording standby state for preparation for the start of next recording.

If the user operates the operation unit 202 to change the mode to a reproduction mode ("reproduction state"), the taken still image or movie can be checked. In particular, in a mode for checking a still image, when the user operates the operation unit 202, the sound can be recorded in association with the still image. In this case, the control unit 201 controls the record control unit 212 to record the sound acquired by the audio processing unit 210 in association with the still image.

If the user operates the operation unit 202 to turn OFF the power, the power supply to the respective blocks is stopped, and the power of the image pickup apparatus 100 is turned OFF.

As described above, the image pickup apparatus 100 of this embodiment can record the image signal and the audio signal together, and record only the audio signal.

The audio signals acquired by the microphones 106*a* and 106*b* according to this embodiment, and the frequency characteristics of the audio signals from an output unit of the combining unit 207 will be specifically described below with reference to FIGS. 2 and 3A to 3F.

FIGS. 3A to 3F are graphs showing frequency characteristics of the respective microphones. In each graph, the vertical axis plots the gain, and the horizontal axis plots the frequency. For the description, the sensitivity characteristic for the sound and the sensitivity characteristic for the wind noise are individually plotted.

Figure 3A:
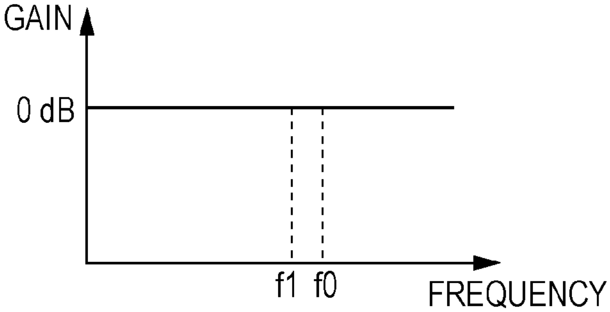
FIG. 3A illustrates a frequency characteristic of a normal microphone for a sound according to this embodiment.
Figure 3B:
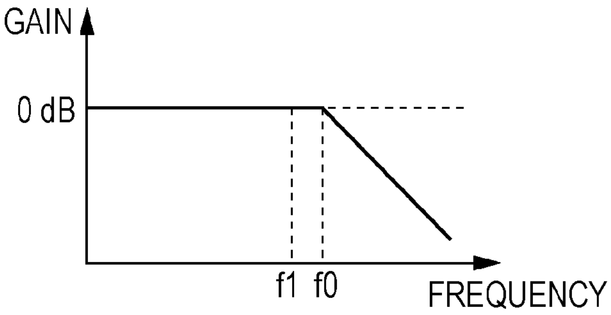
FIG. 3B illustrates a frequency characteristic of a shielded microphone for a sound according to this embodiment.
Figure 3C:
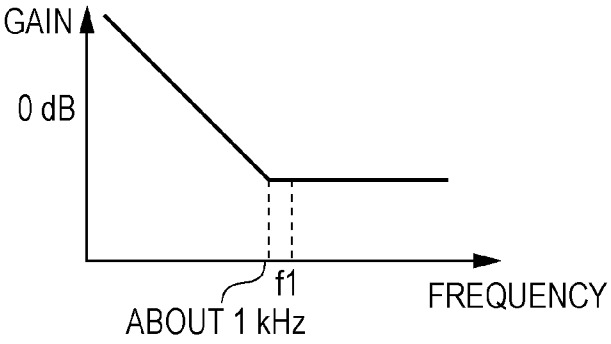
FIG. 3C illustrates a frequency characteristic of a normal microphone for a wind noise according to this embodiment.
Figure 3D:
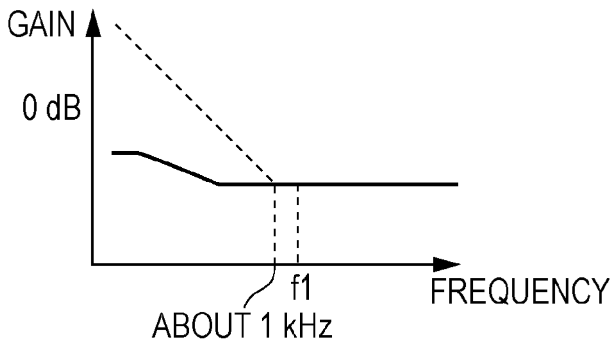
FIG. 3D illustrates a frequency characteristic of a shielded microphone for a wind noise according to this embodiment.
Figure 3E:
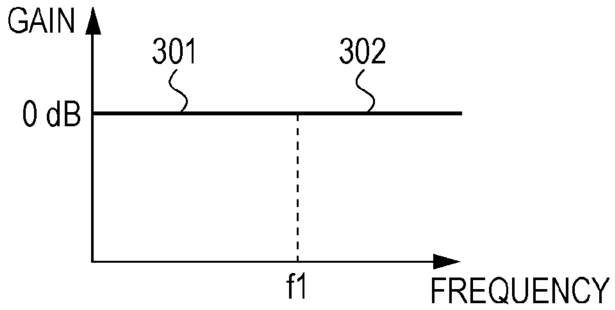
FIG. 3E illustrates a frequency characteristic for a combined sound.
Figure 3F:
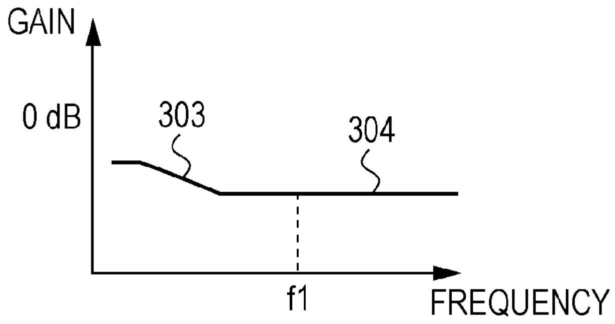
FIG. 3F illustrates a frequency characteristic for a combined wind noise according to this embodiment.

FIG. 3A illustrates a frequency characteristic of the microphone 106*a* for a sound arriving at the microphone 106*a* through the opening 107. FIG. 3B illustrates a frequency characteristic of the microphone 106*b* for a sound when the microphone 106*b* is shielded from the air outside the apparatus by the elastic member 108. FIG. 3C illustrates a frequency characteristic of the microphone 106*a* for a wind noise when wind hits the apparatus body. A wind noise acquired by a microphone tends to have a frequency of 3 kHz or lower, and more particularly 1 kHz or lower. FIG. 3C illustrates such a state. FIG. 3D illustrates a frequency characteristic of the microphone 106*b* for a wind noise when the microphone 106*b* is shielded from the air outside the apparatus by the elastic member 108 and when wind hits the apparatus body. FIG. 3E illustrates a frequency characteristic for a sound input from the output unit of the combining unit 207. FIG. 3F illustrates a frequency characteristic for a wind noise from the output unit of the combining unit 207 when wind hits the apparatus body.

FIGS. 3B and 3D illustrate the sensitivity characteristics of the microphone 106*a* by broken lines. In each graph, f0 indicates a resonant frequency of the elastic member 108, and f1 indicates a cutoff frequency of the low pass filter 208 or the high pass filter 209.

Referring to FIG. 3A, the microphone 106*a* has a substantially uniform sensitivity characteristic for frequencies from a low-frequency band to a high-frequency band.

Referring to FIG. 3B, the sensitivity characteristic for frequencies of the microphone 106*b* when the microphone 106*b* is shielded from the air outside the apparatus by the elastic member 108 is a uniform sensitivity characteristic for frequencies lower than the resonant frequency of the elastic member 108. This is because the elastic member 108 is resonated by the sound that is waves of compression (pressure variation) of the air, and hence the air between the elastic member 108 and the microphone 106*b* can be vibrated. However, the sensitivity to the sound with frequencies higher than the resonant frequency of the elastic member 108 is lowered. This is because the waves of compression of the air are reversed earlier than that the elastic member 108 is vibrated, when the frequencies are higher than the resonant frequency of the elastic member 108. Thus, the elastic member 108 is not substantially vibrated. If this phenomenon is expressed by another physical phenomenon, this phenomenon is equivalent to a phenomenon in which a one-degree-of-freedom spring system is not resonated even if a vibration with a higher frequency than a natural frequency of the spring system is applied.

The elastic member 108 of this embodiment is incapable of directly transmitting an air vibration to the microphone 106*b* unlike a sheet-like screen made of polyurethane foam, cloth, or a wire mesh having air permeability. Hence, referring to FIG. 3B, the sensitivity to the high-frequency component is degraded.

That is, the elastic member 108 serves as a physical low pass filter for a normal sound.

Next, description is given with measured values. Referring to FIG. 3C, the microphone 106*a* has a high sensitivity to the wind noise with frequencies lower than about 1 kHz. If the wind hits the microphone, since the wind noise is included in the low-frequency component (for example, about 1 kHz or lower) by a predetermined amount or larger, the gain for low frequencies is increased for the wind noise as shown in FIG. 3C. In other words, when the wind blows by a certain amount, the microphone 106*a* has a higher sensitivity to the lower frequency component for the wind noise. In this embodiment, an example is described with reference to FIG. 3C, in which the sensitivity of the microphone 106*a* to the wind noise is a predetermined value or higher for frequencies lower than about 1 kHz. If the microphone 106*b* is not covered with a resin film, the microphone 106*b* exhibits the sensitivity characteristic equivalent to that of the microphone 106*a*.

Referring to FIG. 3D, the gain of the microphone 106*b*, which has a gain of frequencies lower than about 1 kHz for the wind noise with a frequency, is lower than that of the microphone 106*a*. The microphone 106*b* is not substantially affected by the influence of the change in airflow rate of the air outside the apparatus because the elastic member 108 is provided. Hence, the wind does not directly hit the microphone 106*b*, or the pressure variation due to the turbulent flow of the air is not generated on the surface of the microphone 106*b*. Accordingly, even if the wind blows, the gain for the wind noise is low.

In this embodiment, the combining unit 207 combines a frequency component with the frequency f1 or higher acquired by the microphone 106*a* and extracted by the HPF 209, with a frequency component with the frequency f1 or lower acquired by the microphone 106*b* and extracted by the LPF 208.

Referring to FIG. 3E, the sensitivity characteristic for the sound with frequencies output from the combining unit 207 contains a sound 301 with the frequency f1 or lower and a sound 302 with the frequency f1 or higher. The sound 301 with the frequency f1 or lower mainly includes a sound with the frequency f1 or lower acquired by the microphone 106*b* and extracted by the LPF 208. The sound 302 with the frequency f1 or higher mainly includes a sound with the frequency f1 or higher acquired by the microphone 106*a* and extracted by the HPF 209.

Referring to FIG. 3F, the volume of a sound (sensitivity characteristic) for the wind noise with frequencies output from the combining unit 207 when the wind hits the image pickup apparatus 100 by a certain amount contains a sound 303 with the frequency f1 or lower and a sound 304 with the frequency f1 or higher. The sound 303 with the frequency f1 or lower mainly includes a wind noise with the frequency f1 or lower acquired by the microphone 106*b* and extracted by the LPF 208. The sound 304 with the frequency f1 or higher mainly includes a wind noise with the frequency f1 or higher acquired by the microphone 106*a* and extracted by the HPF 209.

As shown in FIG. 3E, regarding the output of the combining unit 207, the sensitivity characteristic for the input sound is substantially equivalent to the sensitivity characteristic of the microphone 106*a*. Also, as shown in FIG. 3F, regarding the output of the combining unit 207, the sensitivity characteristic for the wind noise is substantially equivalent to the sensitivity characteristic of the microphone 106*b*.

That is, the audio signal output from the combining unit 207 exhibits a substantially uniform frequency characteristic from a low-frequency band to a high-frequency band for the sound like the sound acquired by the microphone 106*a*. If the wind hits the image pickup apparatus 100, the audio signal output from the combining unit 207 exhibits a low sensitivity characteristic to the wind noise even if the wind noise has a low-frequency component. That is, the audio signal output by the combining unit 207 can have a reduced influence by the wind noise, while the sensitivity characteristic of the audio signal for the sound is not degraded.

In this embodiment, the wind is shielded by the elastic member 108. Thus, the wind noise is reduced as compared with the related art, and the sensitivity to the normal sound can be prevented from being degraded. However, the sound with frequencies equal to or higher than the resonant frequency f0 of the elastic member 108 is attenuated. The audio signal for the attenuated sound is complemented by the sound with the frequency f0 or higher acquired by the microphone 106*a* without the elastic member 108. The sound with the reduced wind noise can be acquired.

Accordingly, the audio signals with the reduced influence of the wind noise can be acquired.

Now, the relationship among the resonant frequency f0 of the elastic member 108, the cutoff frequency f1 of the LPF 208 and the HPF 209, and the wind noise will be described. The wind noise frequently appears for frequencies of about 1 kHz or lower.

In this embodiment, the audio signal corresponding to the wind noise is acquired from the audio signal acquired by the microphone 106*b* having a low sensitivity to the wind noise because of the elastic member 108.

Owing to this, the resonant frequency f0 of the elastic member 108 has to be at least about 1 kHz or higher (in a frequency band having a low sensitivity to the wind noise) in this embodiment. Also, the elastic member 108 has to be made of a material that prevents the influence by a large pressure variation, which is resulted from the air vibration or air movement outside the apparatus, from being directly transmitted to the microphone 106*b*.

The wind noise typically has frequencies of 3 kHz or lower. Hence, the elastic member 108 desirably has a resonant frequency of 3 kHz or higher.

The LPF 208 acquires an audio signal mainly with frequencies of the frequency f1 or lower acquired by the microphone 106*b*, and the HPF 209 acquires an audio signal mainly with frequencies of the frequency f1 or higher acquired by the microphone 106*a*. The resonant frequency f0 of the elastic member 108 is about 1 kHz or higher (in the frequency band having the low sensitivity to the wind noise). The HPF 209 has to acquire an audio signal with frequencies of about 1 kHz or higher (in the frequency band having the low sensitivity to the wind noise) acquired by the microphone 106*a*. Hence, the cutoff frequency f1 has to be at least about 1 kHz or higher (in the frequency band having the low sensitivity to the wind noise). The LPF 208 has to acquire the sound with the resonant frequency f0 or lower of the elastic member 108. The cutoff frequency f1 of the LPF 208 has to be equivalent to or lower than the resonant frequency f0 of the elastic member 108. Therefore, when the wind noise is generated, the cutoff frequency f1 of the LPF 208 and the HPF 209 has to be about 1 kHz or higher (or frequencies having a low sensitivity to the wind noise), and the resonant frequency f0 of the elastic member 108 or lower. In this embodiment, the frequency of about 1 kHz or higher is considered as the frequency at the low level of the wind noise. However, this may be changed depending on the characteristics of the microphones. For example, frequencies may be 2 kHz, 3 kHz, or 500 Hz.

Namely, this embodiment satisfies the relationship of (1 kHz)<(cutoff frequency f1)<(resonant frequency f0).

As described above, the image pickup apparatus 100 according to this embodiment can record the image data acquired by the image pickup unit 203 together with the audio data acquired by the audio processing unit 210, in the memory card 213. Then, the sound acquired by the microphone **106*b* shielded from the outside of the apparatus by the elastic member 108 is combined with the sound acquired by the microphone 106*a* without the elastic member 108**. Accordingly, the wind noise is reduced.

As described above, in the image pickup apparatus 100 according to this embodiment, since the microphone **106*b* is shielded from the outside of the apparatus by the elastic member 108**, the audio signal with the effectively reduced wind noise can be acquired.

Also, since the microphone **106*b* that is shielded from the outside of the apparatus by the elastic member 108, and the microphone 106*a*** that is not shielded from the outside are used, the audio signal with the further effectively reduced wind noise can be acquired.

An operation when the image pickup apparatus 100 of this embodiment has a "low-frequency audio monitoring mode" for monitoring the audio signal with low frequencies without the wind noise will be described. In this mode, only the sound acquired by the microphone **106*b* that is shielded from the outside of the apparatus by the elastic member 108 is used, so that the sound with a low-frequency component without the wind noise can be acquired. When the user uses this mode, the user can monitor the sound with a low-frequency component that is non-audible because the sound is hidden by the wind noise, for example, during the preparation for the image taking. Accordingly, the user can recognize the presence of a noise with a low-frequency component other than the wind noise before the image taking. This function may not be provided in the image pickup apparatus 100** of this embodiment, and may be provided in any apparatus that records a sound. Thus, the same advantage can be attained.

In the "low-frequency audio monitoring mode," the sound acquired by the microphone **106*a* and the sound acquired by the microphone 106*b*** may be selectively or alternately output. Accordingly, the user can recognize the reduction effect of the wind noise simultaneously. The user can easily notify the noise with a low-frequency component that is hidden by the wind noise and hence not heard by the user.

Alternatively, in the "low-frequency audio monitoring mode," only a sound (first audio signal) acquired by the microphone **106*b* may be output while a predetermined operation member of the operation unit 202** is pressed or while the operation member is not pressed.

Figure 4A:
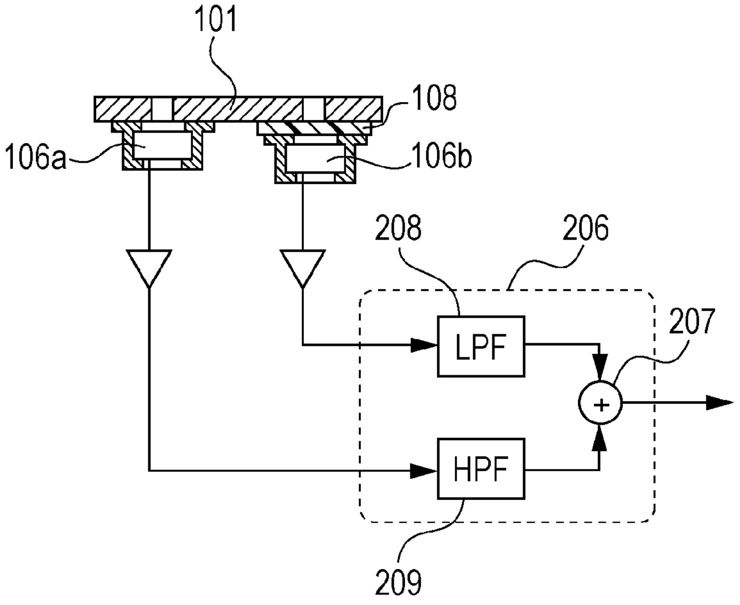
FIG. 4A illustrates another arrangement of microphones according to the first embodiment.
Figure 4B:
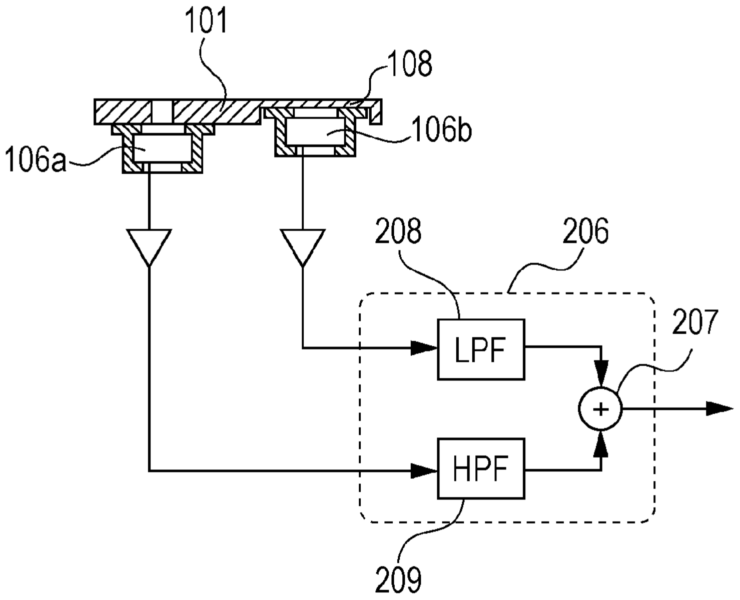
FIG. 4B illustrates still another arrangement of microphones according to the first embodiment.

Also, the relationship between the microphone **106*b* and the elastic member 108 may be one shown in FIGS. 4A and 4B. In the above description, the elastic member 108 is arranged at the outer side of the casing 101 as shown in FIG. 2. Alternatively, the elastic member 108 may be arranged at the inner side of the casing 101 as shown in FIG. 4A. Still alternatively, the elastic member 108 may be integrally formed with the casing 101 as part of the casing 101 as shown in FIG. 4**B.

Arrangement of Microphones

Next, arrangement of the microphones in the image pickup apparatus 100 according to this embodiment will be described.

In this embodiment, as described above, the audio signal generated by combining the audio signals output from the LPF 208 and the HPF 209 by the combining unit 207 is recorded. The filters such as the LPF 208 and the HPF 209 may not completely cut off frequencies of the cutoff frequency f1 or lower, or frequencies of the cutoff frequency f1 or higher.

Hence, when the combining unit 207 combines the output signals from the LPF 208 and the HPF 209, if a phase difference between the sound acquired by the microphone **106*a* and the sound acquired by the microphone 106*b*** becomes large, the difference may adversely affect the audibility.

In this embodiment, the positional relationship between the microphones **106*a* and 106*b*** is defined as follows.

Regarding the phase difference which may adversely affect the audibility, the phase difference has to be within 90 degrees. If the phase difference is 90 degrees, for example, the peak of the signal of the microphone **106*b* may be occasionally zero with respect to the peak of the signal of the microphone 106*a*. In this case, the resulting sound may be markedly disordered. In this embodiment, for example, the phase difference is 45 degrees (hereinafter, referred to as allowable phase difference), so that the audio signal with reduced adverse effect for the audibility can be acquired. In a case in which the cutoff frequency f1 of the LPF 208 and HPF 209 is 1 kHz, when it is assumed that the sound speed is 340 m/s, the positional relationship between the microphones 106*a* and 106*b*** is obtained by the following expression.

340000[m/s]/1000[Hz(=1/s)]*45[deg]/360[deg]=42.5[m]

The general expression of the above expression is as follows.

(Sound speed)/(cutoff frequency $f1$)*(allowable phase difference)/360=(microphone-to-microphone distance range)

The microphones **106*a* and 106*b*** have the relationship within the range obtained from the cutoff frequency and the allowable phase difference.

In this embodiment, the microphones **106*a* and 106*b* are located to have a distance therebetween of 42.5 mm or smaller. If it is assumed that the sound in the vertical direction with respect to the image-taking direction is not basically input, as long as the distance between the microphones 106*a* and 106*b* is within 42.5 mm in the horizontal direction of the image pickup apparatus 100, the microphones 106*a* and 106*b* may be separated from each other by any distance in the vertical direction. Even with this arrangement, particularly when the image pickup apparatus 100 takes a movie, the peak of the signal acquired by the microphone 106*a* and the peak of the signal acquired by the microphone 106*b***, the signals which have frequencies around the cutoff frequency, likely fall within the allowable phase difference.

This is because the image pickup apparatus 100 typically records the sound of the object subjected to the image taking. Hence, the sound subjected to the recording hardly comes in the vertical direction, whereas the sound is likely input in any direction of the front-rear direction and the left-right direction (in the horizontal direction of the image pickup apparatus 100). More specifically, a delay (phase difference) may occur between sounds arriving at the image pickup apparatus 100 in the horizontal direction of the image pickup apparatus 100. However, such sounds arrive at the image pickup apparatus 100 in the vertical direction substantially simultaneously. That is, a delay may occur between a sound from the right and a sound from the left of the image pickup apparatus 100 by a period of (length of image pickup apparatus)/(sound speed). However, a sound from the upper right and a sound from the lower right of the image pickup apparatus 100 also arrive at the image pickup apparatus 100 substantially simultaneously. Thus, a delay does not substantially occur. Also, a delay does not substantially occur between a sound from the upper left and a sound from the lower left. In this embodiment, regarding such situations, the arrangement of the microphones has a high degree of freedom.

In this embodiment with the above configuration, the audio signal with the reduced influence of the wind noise with the low-frequency component can be acquired from the sound acquired by the microphone 106*b*. In addition, the audio signals with the reduced influence of the wind noise included in the normal sound can be acquired from the audio signals acquired by the microphones 106*a* and 106*b*.

Second Embodiment

Next, an image pickup apparatus with an arrangement of microphones, the arrangement which is different from that of the first embodiment, will be described. In this embodiment, the same reference signs are applied to components having the same functions as those of the first embodiment, and the redundant description will be omitted. Also, the image pickup apparatus of this embodiment has the normal operations and the basic functions of the image pickup apparatus described in the first embodiment. In this embodiment, first to third audio collecting units are provided.

This embodiment differs from the first embodiment for the arrangement of microphones. In this embodiment, two microphones that are not shielded by an elastic member are provided in addition to a microphone that is shielded from the outside of the apparatus by an elastic member 108. With this configuration, the image pickup apparatus of this embodiment can generate audio signals by a plurality of channels.

Figure 5:
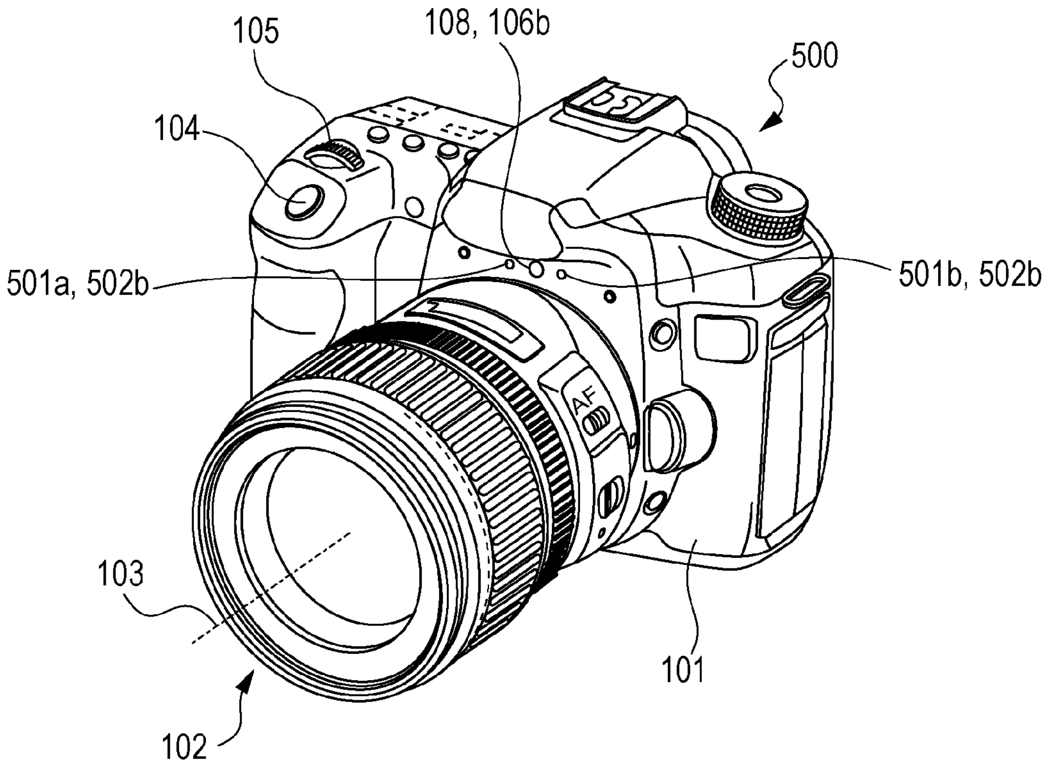
FIG. 5 is an external view of an image pickup apparatus according to a second embodiment.

FIG. 5 illustrates the configuration of the image pickup apparatus according to this embodiment.

In FIG. 5, reference sign 500 denotes the image pickup apparatus of this embodiment. A substantially non-directional microphone 106*b* is shielded from the outside of the apparatus by the elastic member 108. Substantially non-directional microphones 502*a* and 502*b* are respectively provided inside openings 501*a* and 501*b* (in a direction toward the inside of the apparatus). The openings 501*a* and 501*b* are provided at a casing 101 of the image pickup apparatus 500. Other configuration is similar to that of the first embodiment. Hence, the same reference signs are applied to the same components, and the redundant description will be omitted.

Figure 6:
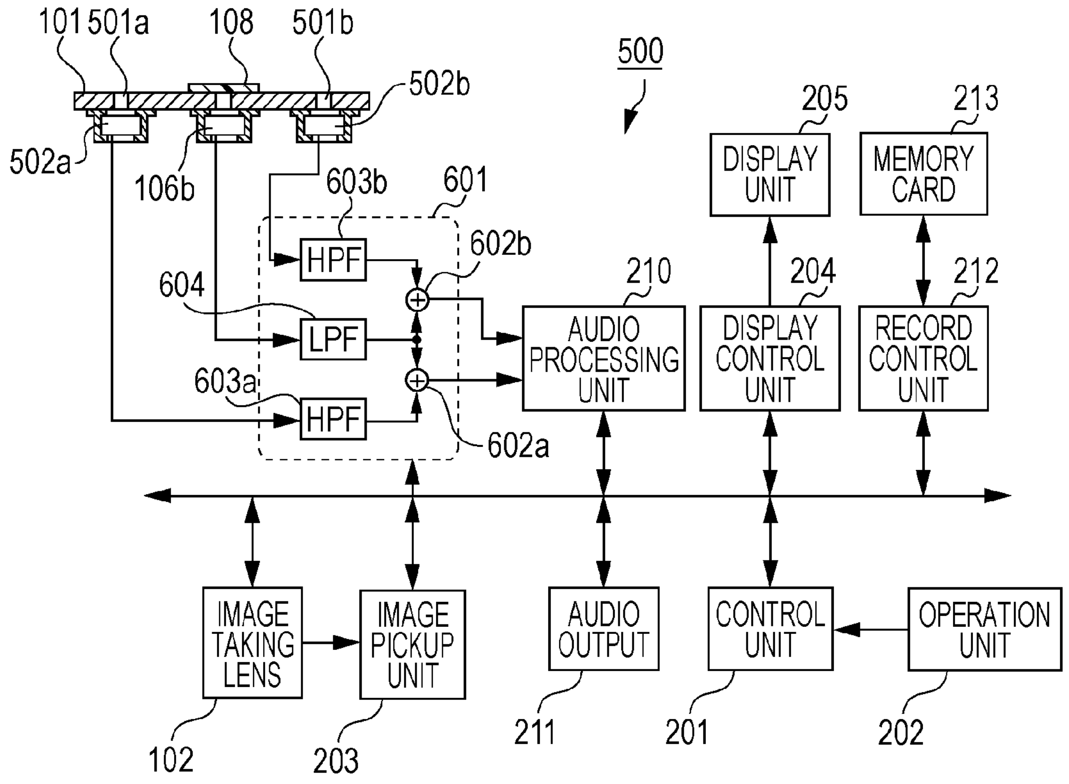
FIG. 6 is a functional block diagram of the image pickup apparatus according to the second embodiment.

Next, the configuration and operation of the image pickup apparatus 500 according to this embodiment will be described with reference to FIG. 6. In FIG. 6, the same reference signs are applied to functions similar to those shown in FIG. 2, and the redundant description will be omitted.

Referring to FIG. 6, an audio acquiring unit 601 includes combining units 602*a* and 602*b*, high pass filters (HPFs) 603*a* and 603*b*, and a low pass filter (LPF) 604. The audio acquiring unit 601 combines audio signals acquired by the microphones 502*a*, 502*b*, and 106*b*. The combining unit 602*a* combines the audio signals acquired by the microphones 502*a* and 106*b*. The combining unit 602*b* combines the audio signals acquired by the microphones 502*b* and 106*b*. The HPFs 603*a* and 603*b* extract signals in specific frequency bands from the audio signals acquired by the microphones 502*a* and 502*b*. At this time, signals in frequency bands of the cutoff frequency f1 or higher are extracted like the first embodiment.

The LPF 604 extracts signals in a specific frequency band from the audio signal acquired by the microphone 106*b*. At this time, a signal in a frequency band of the cutoff frequency f1 or lower is extracted like the first embodiment. In this embodiment, the high pass filter and the low pass filters are used to extract the signals in the specific frequency bands. Alternatively, other filters, such as band-pass filters or notch filters may be used. Also, the cutoff frequency f1 of the HPFs 603*a* and 603*b* and the LPF 604 is about 1 kHz or higher (in the frequency band having the low sensitivity to the wind noise) and the resonant frequency f0 of the elastic member 108 or lower, like the first embodiment. The control unit 201 can turn ON and OFF the operations of the HPFs 603*a* and 603*b* and the LPF 604 as required, and change the filter coefficients thereof. Also, the control unit 201 can turn ON and OFF the operations the combining units 602*a* and 602*b* as required, and adjust the ratio of combination.

The normal operation of the image pickup apparatus 500 according to this embodiment will be described below. The normal operation of the image pickup apparatus 500 is similar to that of the image pickup apparatus 100 according to the first embodiment. Only a different point will be described.

In the "image-taking standby state," the sound is acquired such that the audio acquiring unit 601 extracts signals in the specific frequency bands from the audio signals acquired by the microphones 502*a*, 502*b*, and 106*b*. Then, the audio processing unit 210 processes the extracted audio signals.

Even in the "image taking state," the sound is acquired such that the audio acquiring unit 601 extracts signals in the specific frequency bands from the audio signals acquired by the microphones 502*a*, 502*b*, and 106*b*. Then, the audio processing unit 210 processes the extracted audio signals. The audio signals acquired by the audio processing unit 210 are successively recorded in the memory card 213.

In the "reproduction state," the operation in this embodiment is similar to that of the image pickup apparatus 100 according to the first embodiment.

The frequency characteristics for the audio signals acquired by the microphones 502*a*, 502*b*, and 106*b* and the audio signals from output units of the combining units 602*a* and 602*b* of the image pickup apparatus 500 of this embodiment can be described with reference to FIGS. 3A to 3F.

FIG. 3A illustrates a frequency characteristic of the microphones 502*a* and 502*b* for a sound arriving at the microphones 502*a* and 502*b* through the openings 501*a* and 501*b*. FIG. 3B illustrates a frequency characteristic of the microphone 106*b* for a normal sound acquired by the microphone 106*b* when the microphone 106*b* is shielded from the air outside the apparatus by the elastic member 108. FIG. 3C illustrates a frequency characteristic of the microphones 502*a* and 502*b* for a wind noise when the wind hits the apparatus body. A wind noise acquired by a microphone tends to have a frequency of 3 kHz or lower, and more particularly 1 kHz or lower. FIG. 3C illustrates such a state. FIG. 3D illustrates a frequency characteristic of the microphone 106*b* for a wind noise when the microphone 106*b* is shielded from the air outside the apparatus by the elastic member 108 and when the wind hits the apparatus body. FIG. 3E illustrates a frequency characteristic for an input sound from output units of the combining units 602*a* and 602*b*. FIG. 3F illustrates a frequency characteristic for a wind noise from the output units of the combining units 602*a* and 602*b* when the wind hits the apparatus body. The cutoff frequency f1 of the HPFs 603*a* and 603*b*, and the LPF 604 and the resonant frequency f0 of the elastic member 108 are similar to those of the first embodiment, and the redundant description will be omitted.

Desirable arrangement of microphones in the image pickup apparatus 500 of this embodiment will be described with reference to FIG. 7.

As described in the first embodiment, the microphone 106*b* that is shielded from the air outside the apparatus by the elastic member 108, and the microphones 502*a* and 502*b* may be arranged within the range obtained by Expression 2. For example, if the cutoff frequency f1 is 1 kHz, when it is assumed that the sound speed is 340 m/s, the microphone 106*b* may be desirably arranged within a range of 42.5 mm from both the microphones 502*a* and 502*b*.

Figure 7:
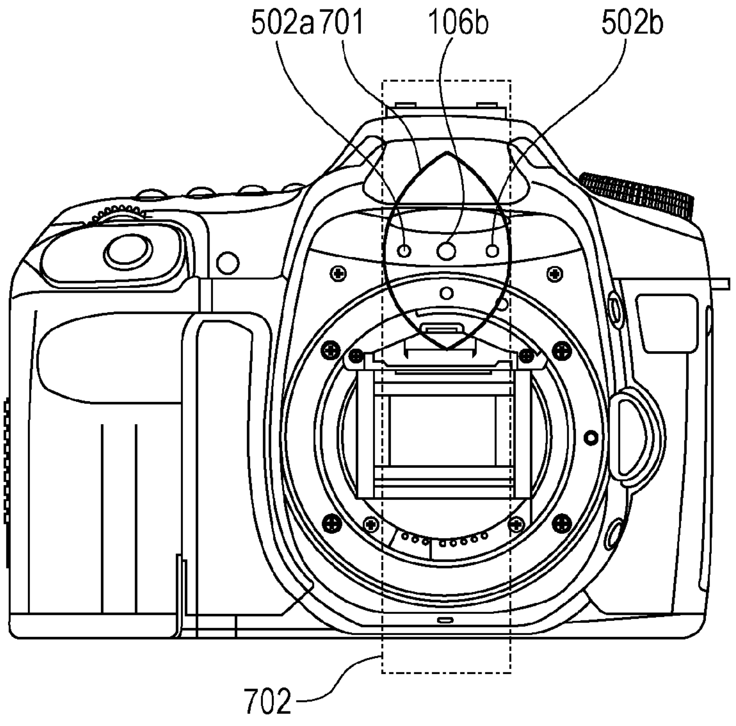
FIG. 7 illustrates a range in which a microphone 106*b* of the image pickup apparatus according to the second embodiment can be arranged.

A region 701 in FIG. 7 is a range in which the microphone 106*b* may be arranged.

If it is difficult to arrange the microphone 106*b* in the region 701, the microphone 106*b* may be arranged in a region vertically extending above and below a line connecting the microphones 502*a* and 502*b*, the line which is a segment within the range of 42.5 mm from both the microphones 502*a* and 502*b*. The region is a region 702 shown in FIG. 7.

The reason for the arrangement in this region is that since the image pickup apparatus 500 of this embodiment generates a stereophonic sound, the image pickup apparatus 500 does not have reproducibility for the sound in the vertical direction, in addition to the reason mentioned in the first embodiment. If the phase of a sound matches the phase of another sound in the horizontal direction, the user hardly feels uncomfortable about the sounds when the sounds are reproduced. Thus, the microphone 106*b* is arranged in the region vertically extending above and below a line connecting the microphones 502*a* and 502*b*, the line which is a segment within the range of 42.5 mm from both the microphones 502*a* and 502*b*, that is, in the region 702. In other words, the microphone 106*b* is arranged within the range of 42.5 mm in the direction parallel to the line connecting the microphones 502*a* and 502*b* but the microphone 106*b* may be arranged at any position in a direction perpendicular to the line.

With this configuration, the image pickup apparatus 500 of this embodiment can acquire audio signals by a plurality of channels with the reduced influence of the wind noise.

Third Embodiment

Next, an image pickup apparatus which is different from that of the second embodiment will be described. In this embodiment, the same reference signs are applied to components having the same functions as those of the second embodiment, and the redundant description will be omitted. Also, the image pickup apparatus of this embodiment has the normal operations and the basic functions of the image pickup apparatus described in the first embodiment.

This embodiment differs from the second embodiment for the arrangement of microphones. In this embodiment, the position of the microphone 106*b* with respect to the microphones 502*a* and 502*b* is different from that of the second embodiment. Owing to this, an audio acquiring unit that combines audio signals acquired by the microphones 502*a*, 502*b*, and 106*b* has a configuration different from that of the second embodiment. The microphones are substantially nondirectional like the second embodiment.

Figure 8:
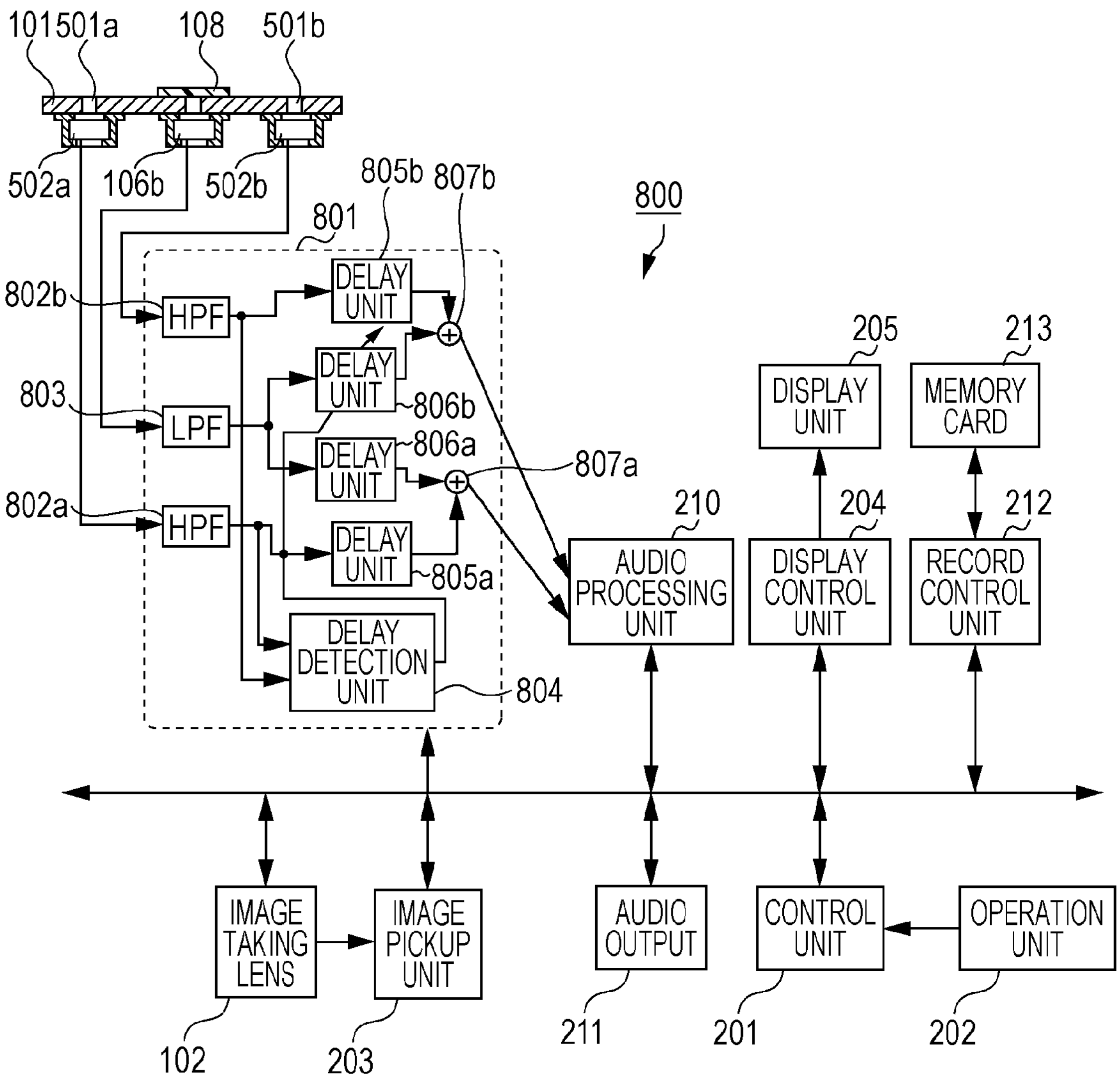
FIG. 8 is a functional block diagram of an image pickup apparatus according to a third embodiment.

FIG. 8 illustrates the configuration of an image pickup apparatus 800 according to this embodiment. In FIG. 8, the same reference signs are applied to functions similar to those shown in FIG. 2, and the redundant description will be omitted.

Referring to FIG. 8, an audio acquiring unit 801 combines audio signals acquired by the microphones 502*a*, 502*b*, and 106*b*. The audio acquiring unit 801 includes HPFs 802*a* and 802*b*, a LPF 803, a delay detection unit 804, delay units 805*a* and 805*b*, applicative delay units 806*a* and 806*b*, and combining units 807*a* and 807*b*. In this embodiment, the degree of freedom for arrangement of the microphone 106*b* is increased due to the processing by the audio acquiring unit 801.

The HPFs 802*a* and 802*b*, and the LPF 803 can acquire frequencies within specific ranges of the microphones 502*a*, 502*b*, and 106*b*, like the first and second embodiments. The delay detection unit 804 can detect a phase difference between audio signals acquired by the microphones 502*a* and 502*b*. For example, this embodiment may use a method that detects a delay (phase difference) if the delay is for a time in which the correlation between the audio signals acquired by the microphones 502*a* and 502*b* becomes the strongest. To be more specific, the audio signals acquired by the microphones 502*a* and 502*b* are converted by analog to digital conversion, and stored in a memory. Then, the correlation between the signals is detected. A difference between times at which the correlation becomes the strongest is detected as the delay time.

The delay detection unit 804 can detect a delay or an advance of one of the audio signals acquired by the microphones 502*a* and 502*b* relative to the other.

With the delay detection unit 804, by detecting the delay or advance, the direction of a major sound source of sounds input to the microphones 502*a* and 502*b* can be obtained by calculation. If the sounds come from the front of the apparatus, the sounds arrive at the microphones 502*a* and 502*b* substantially simultaneously. In contrast, if the sounds come from a lateral side of the apparatus, one of the sounds arrives at the microphone at a delayed or advanced timing. Using the relationship, an angle (direction) at which the major sound is input can be calculated from the distance between the microphones 502*a* and 502*b*, and the delay time. A method that compares the audio signals input to the microphones 502*a* and 502*b* with each other and calculates the arrival direction of the sound from the comparison result is an existing technique. Thus, the description of this method will be omitted.

Since the image pickup apparatus is used in this embodiment, the major sound most frequently comes from the horizontal direction of the image to be taken. Thus, the image pickup apparatus of this embodiment calculates the angle of the major sound is as an angle in the horizontal direction of the image to be taken.

If information of the positional relationship between the microphone 106*b*, and the microphones 502*a* and 502*b* is input in advance, a delay time by which the major sound is input to the microphone 106*b* can be calculated. For example, the delay time of the arrival of the sound can be calculated by using the input angle of the major sound and the distance between the microphones 502*a* and 106*b* in the horizontal direction of the image to be taken.

In the image pickup apparatus of this embodiment, the delay detection unit 804 detects a delay or an advance (phase difference) of the audio signals input to the microphones 502*a* and 502*b*, and the delay amount of the sound acquired by the microphone 106*b* is adjusted on the basis of the detected phase difference. The phase difference depending on the position of the microphone 106*b* is corrected, then the audio signals are combined by the combining units 807*a* and 807*b*, and the combined audio signals are output to the audio processing unit 210.

The image pickup apparatus 800 of this embodiment corrects the phase difference of the sound input to the microphone 106*b* by the delay units 805*a* and 805*b*, and the applicative delay units 806*a* and 806*b*. More specifically, the delay units 805*a* and 805*b* delay the input audio signals by predetermined amounts. The applicative delay units 806*a* and 806*b* can change the delay amounts of the input audio signals in accordance with the phase difference detected by the delay detection unit 804.

If the delay amount detected by the delay detection unit 804 is zero second, it is found that the major sound is input from the front of the apparatus. In this case, the applicative delay units 806*a* and 806*b* change the delay amount so that the phase is delayed by the same amount as that of the delay units 805*a* and 805*b*. Accordingly, when the combining unit 807*a* combines the audio signal acquired by the microphone 502*a* with the audio signal acquired by the microphone 106*b*, the sounds can be combined while the phase difference due to the difference between the positions of the microphones 502*a* and 106*b* is corrected. Similarly, when the combining unit 807*b* combines the audio signal acquired by the microphone 502*b* with the audio signal acquired by the microphone 106*b*, the sounds can be combined while the phase difference due to the difference between the positions of the microphones 502*b* and 106*b* is corrected.

If the delay amount detected by the delay detection unit 804 is t second(s) (for example, if the audio signal acquired by the microphone 502*b* with reference to the audio signal acquired by the microphone 502*a* is delayed by t second(s)), the arrival direction of the major sound can be estimated. If the microphone 106*b* is arranged closer to the sound source than the microphones 502*a* and 502*b*, the delay amount of the applicative delay unit 806*a* is increased as compared with the delay amount of the delay unit 805*a*, and the delay amount of the applicative delay unit 806*b* is increased as compared with the delay amount of the delay unit 805*b*. The delay amounts of the applicative delay units 806*a* and 806*b* are determined in accordance with the positional relationship between the microphone 106*b*, and the microphones 502*a* and 502*b*, and the arrival direction of the major sound (delay amount detected by the delay detection unit 804).

Figure 9:
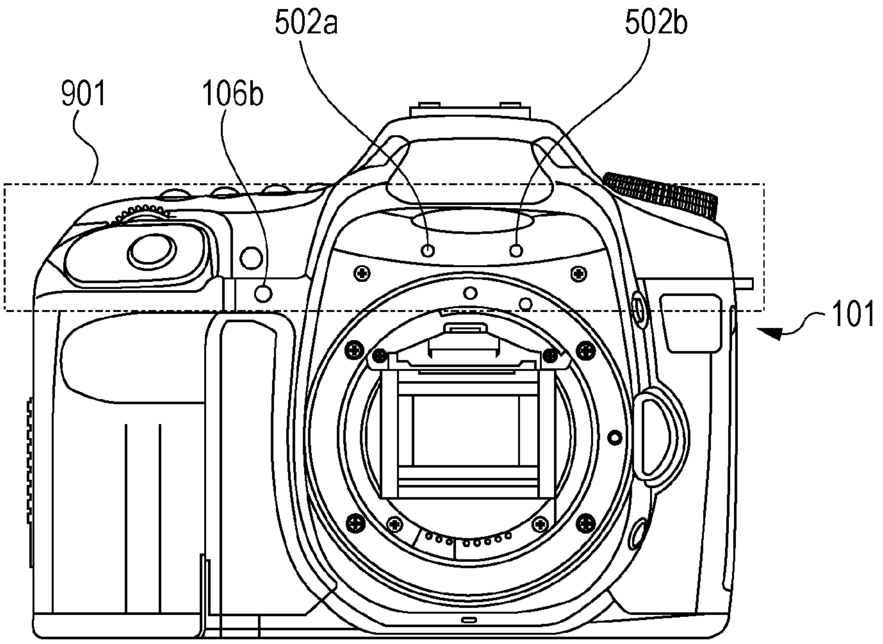
FIG. 9 illustrates a range in which a microphone 106*b* of the image pickup apparatus according to the third embodiment can be arranged.

Desirable arrangement of microphones in the image pickup apparatus 800 of this embodiment will be described with reference to FIG. 9.

In this embodiment, the delay amounts of the applicative delay units 806*a* and 806*b* are determined in accordance with the positional relationship between the microphone 106*b*, and the microphones 502*a* and 502*b*, and the arrival direction of the major sound (delay amount detected by the delay detection unit 804). The arrival direction of the major sound can be predicted by the phase difference between the outputs of the microphones 502*a* and 502*b*. Also, as described above, the image pickup apparatus of this embodiment detects the arrival direction of the major sound as the angle in the horizontal direction of the image to be taken.

Accordingly, for example, if the sound arrives at the image pickup apparatus from the lower left of the image pickup apparatus (at 45 degrees), the angle is detected as the angle in the horizontal direction. A case is assumed in which the microphone 106*b* is arranged at the bottom surface of the image pickup apparatus at a position below the microphones 502*a* and 502*b*. Then, if the sound arrives at the apparatus from a position directly below the apparatus, the sound arrives at the microphone 106*b* first. Meanwhile, the sound arrives simultaneously at the microphones 502*a* and 502*b*. Owing to this, as mentioned above, the audio input unit 801 detects the sound such that the sound comes from the front of the apparatus, and the audio input unit 801 determines the delay amounts of the applicative delay units 806*a* and 806*b* by the same amount as those of the delay units 805*a* and 805*b*.

If the combining unit 807*a* combines the audio signal acquired by the microphone 106*b* with the audio signal acquired by the microphone 502*a*, the audio signal of the microphone 106*b* may be combined such that the audio signal acquired by the microphone 502*a* is delayed by a time, which is obtained by dividing the distance between the microphones 106*b* and 502*a* by the sound speed. As described above, if the position of the microphone 106*b* is too far from the microphones 502*a* and 502*b* in the vertical direction, the delay amounts of the audio signals which are combined by the combining units 807*a* and 807*b* do not match with each other. Consequently, the sound may be disordered.

To avoid such a situation, in this embodiment, the position of the microphone 106*b* is desirably located within the distance determined by using the cutoff frequency f1 of the HPFs 802*a* and 802*b*, and the LPF 803 in the vertical direction of the image pickup apparatus.

In particular, for the vertical direction of the image pickup apparatus, the microphone 106*b* is desirably located within the range obtained by Expression 2, that is, the range of 42.5 mm from both the microphones 502*a* and 502*b* if the cutoff frequency f1 is 1 kHz.

The microphone 106*b* may be arranged at any position in the horizontal direction because the adjustment can be made by the delay amounts of the applicative delay units 806*a* and 806*b*. In particular, the microphone 106*b* may be desirably arranged in a region 901 in FIG. 9.

With this configuration, the image pickup apparatus 800 of this embodiment can acquire audio signals by a plurality of channels with the reduced influence of the wind noise.

Fourth Embodiment

Next, an image pickup apparatus with an arrangement of microphones, the arrangement which is different from that of the first embodiment, will be described. In this embodiment, the same reference signs are applied to components having the same functions as those of the first embodiment, and the redundant description will be omitted. Also, the image pickup apparatus of this embodiment has the normal operations and the basic functions of the image pickup apparatus described in the first embodiment.

This embodiment differs from the first embodiment for a configuration around a microphone 106*b*. In this embodiment, the microphone 106*b*, an opening member 110 for the microphone 106*b*, and an elastic member 108 are elastically supported by elastic support members 109 with respect to the casing 101. With this configuration, a noise propagating through the casing (hereinafter, referred to as "casing propagation noise"), such as a noise generated by vibration that is generated when the user touches the casing (so-called touch noise), can be further reduced as compared with the configuration of the first embodiment.

First, the casing propagation noise will be described. When the image pickup apparatus includes the microphones like this embodiment, the noise called touch noise that is generated when the user touches the casing of the apparatus is collected by the microphones. This is because, for example, the vibration generated when the user touches the casing of the apparatus propagates through the casing and then to the microphones. Regarding the image pickup apparatus according to the first embodiment, the casing propagation noise other than the touch noise may be generated due to vibration that is generated when the optical system of the image taking lens 102 moves. Also in this case, the vibration generated due to the movement of the image taking lens 102 propagates through the casing of the image pickup apparatus and is collected by the microphones.

In addition, in the first embodiment, the vibration propagating through the casing vibrates the elastic member 108 that is in contact with the casing. The elastic member 108 behaves like a diaphragm of a speaker, resulting in that larger casing propagation noise than the noise without the elastic member 108 may be collected by the microphones. To avoid the phenomenon in which the elastic member 108 is vibrated, this embodiment has a structure for isolating the elastic member 108 from vibration with lower frequencies than predetermined frequencies propagating through the casing. The predetermined frequencies are higher than the cutoff frequency of the low pass filter 208 as described in the first to third embodiments.

Figure 10A:
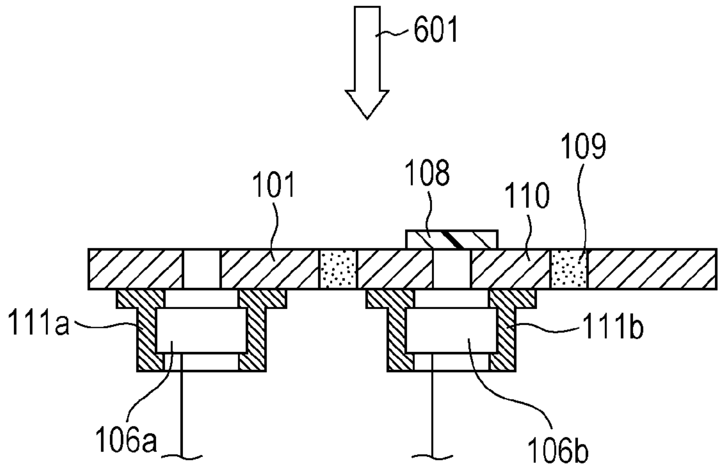
FIG. 10A illustrates an arrangement of microphones of an image pickup apparatus according to a fourth embodiment.
Figure 10B:
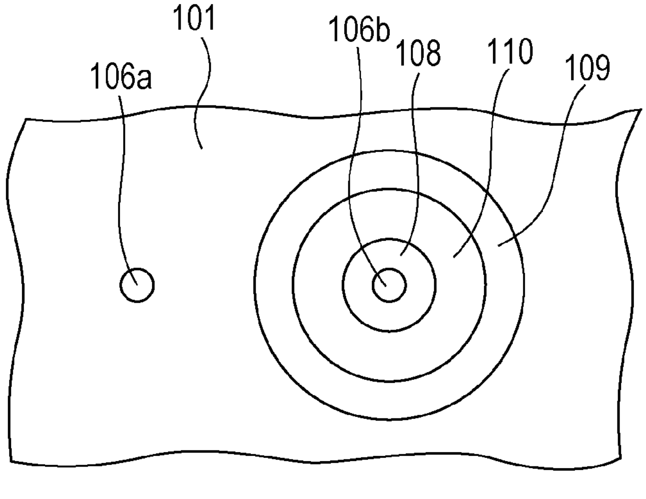
FIG. 10B illustrates the arrangement of the microphones of the image pickup apparatus according to the fourth embodiment.

FIGS. 10A and 10B illustrate the configuration around a microphone 106*a*, the microphone 106*b*, and the elastic member 108 according to the fourth embodiment. Other configuration is similar to that of the first embodiment. The same reference signs are applied to functions similar to those shown in FIG. 2, and the redundant description will be omitted. FIG. 10A is a cross-sectional view showing an area around the audio collecting unit. FIG. 10B is a view from the outside of the casing 101.

In FIG. 10A, microphones 106*a* and 106*b* are elastically supported by microphone support members 111 (111*a* and 111*b*). The opening member 110 has an opening for the microphone 106*b*. The opening is covered with the elastic member 108. A circular elastic support member 109 elastically supports the microphone 106*b*, the elastic member 108, and the opening member 110, and is desirably formed of an elastic material with a low hardness, such as an elastomer, rubber, or gel. The elastic support member 109 is fitted to a hole provided at the casing 101. The elastic support member 109 can absorb the vibration, such as the touch noise, propagating through the casing. The casing propagation noise transmitted to the elastic member 108 can be reduced. That is, the elastic support member 109 is arranged to prevent the vibration of the casing 101 from being transmitted to the opening member 110. Hence, the elastic support member 109 does not have to be circular.

Next, the feature and the desirable configuration of the image pickup apparatus according to the fourth embodiment will be described with reference to FIGS. 11A and 11B, and 12A to 12C.

Figure 11A:
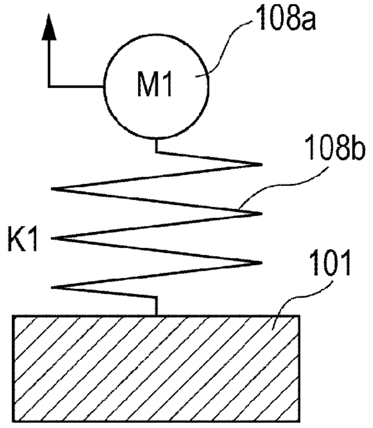
FIG. 11A illustrates a physical model for propagation of an audio vibration of the image pickup apparatus according to the first embodiment.
Figure 11B:
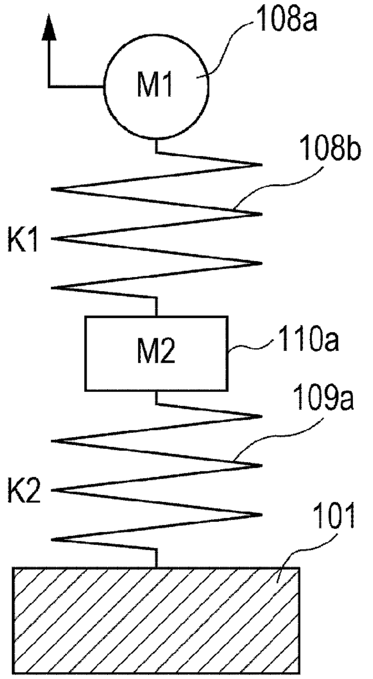
FIG. 11B illustrates a physical model for propagation of an audio vibration of the image pickup apparatus according to the fourth embodiment.

FIGS. 11A and 11B illustrate models of the vibrations of the elastic members 108. FIG. 11A is a model for the first embodiment, and FIG. 11B is a model for the fourth embodiment. Reference sign 108*a* denotes a weight for the elastic member 108. The weight 108*a* has a mass M1. Reference sign 108*b* denotes a spring characteristic when the elastic member 108 is provided at the casing 101. The spring characteristic 108*b* has a spring modulus K1. Reference sign 110*a* denotes a weight for the opening member 110. The weight 110 has a mass M2. Reference sign 109*a* denotes a spring characteristic of the elastic support member 109. The spring characteristic 109 has a spring modulus K2. M2 is sufficiently larger than M1. K2 is sufficiently smaller than K1. The spring modulus is used in this embodiment. Alternatively, an elastic modulus may be used.

Figure 12A:
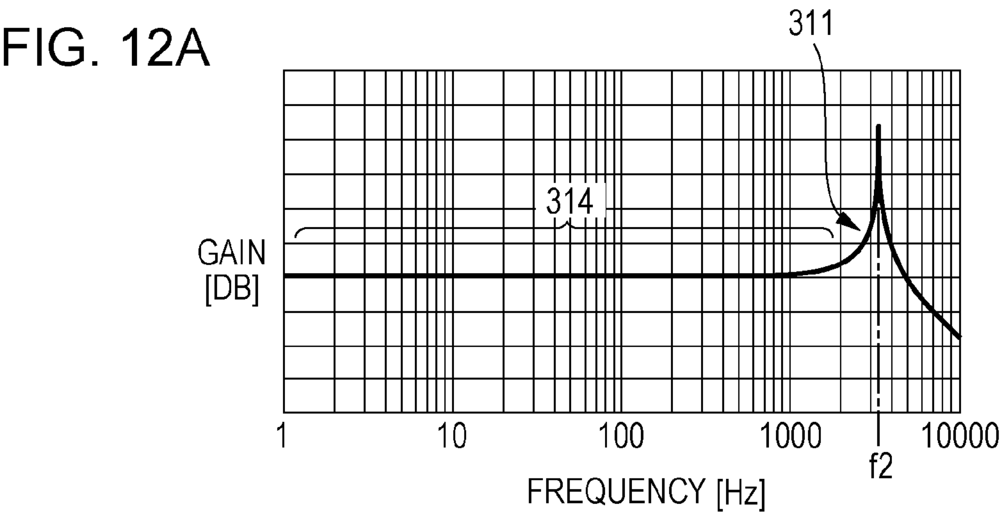
FIG. 12A illustrates a frequency characteristic of an elastic member 108 of the image pickup apparatus according the fourth embodiment.
Figure 12B:
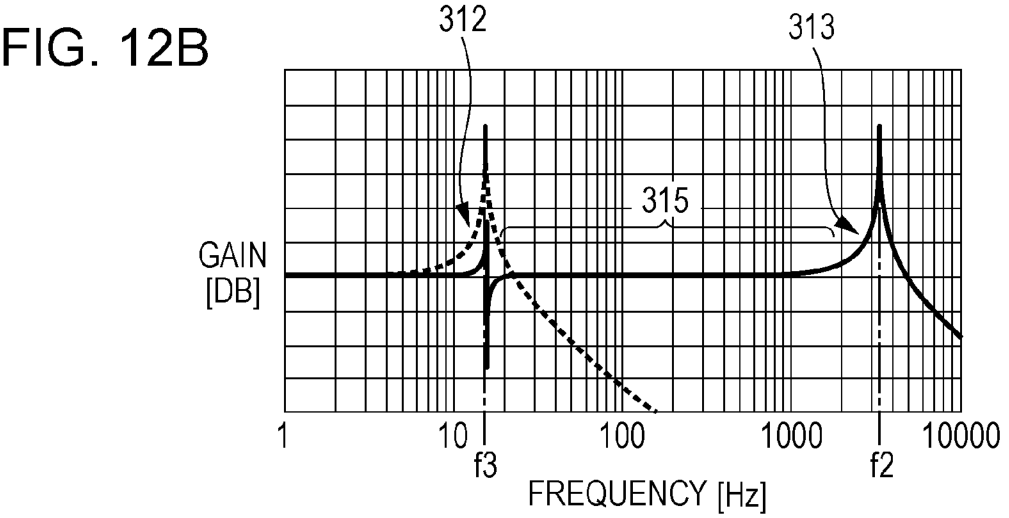
FIG. 12B illustrates a frequency characteristic of the elastic member 108 of the image pickup apparatus according to the fourth embodiment.
Figure 12C:
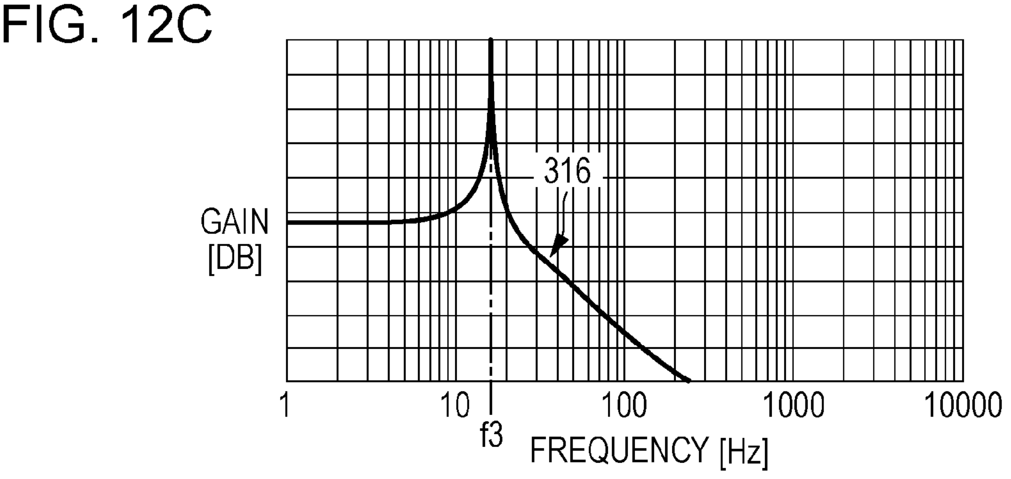
FIG. 12C illustrates a frequency characteristic of the elastic member 108 of the image pickup apparatus according to the fourth embodiment.

FIGS. 12A to 12C illustrate frequency characteristics of the weights 108*a* and 110*a* modeled in FIGS. 11A and 11B. FIGS. 12A and 12B each provide a frequency characteristic when vibration is applied to M1, that is, when vibration of the air by a sound is transmitted to the elastic member 108. Each of FIGS. 12A to 12C is plotted such that the material of the elastic member 108 is a polyimide film, the material of the opening member 110 is brass, and the material of the elastic support member 109 is elastomer rubber, and the masses and spring moduli of these components are determined the following expressions.

$$M1=5.0e^{-4}[g]$$

$$M2=0.5[g]$$

$$K1=100[g/mm]$$

$$K2=5[g/mm]$$

Referring to FIG. 12A, reference sign 311 denotes a frequency characteristic of the elastic member 108 (i.e., frequency characteristic of the weight 108*a*) for the input to the elastic member 108 shown in FIG. 11A. The frequency characteristic 311 has a flat characteristic in the range of a band 314 extending to a resonant frequency f2 obtained from the mass and the spring modulus of the elastic member 108. However, this system has a frequency characteristic similar to the response to the casing propagation noise due to the vibration of the casing 101. In other words, the response is made for the vibration propagating through the casing in a similar manner to the audio vibration transmitted to the elastic member 108. Consequently, the vibration is collected by the microphones. Also, the casing propagation noise is collected by the microphones.

In contrast, referring to FIG. 12B, reference sign 312 denotes a frequency characteristic of the opening member 110 (i.e., frequency characteristic of the weight 110*a*) for the input to the elastic member 108 shown in FIG. 11B. Reference sign 313 denotes a frequency characteristic of the elastic member 108 (i.e., frequency characteristic of the weight 108*a*) for the input to the elastic member 108 shown in FIG. 11B. With the frequency characteristic 313, the frequency characteristic 313 is attenuated in a band with the resonant frequency f2 or higher, the resonant frequency f2 which is obtained from the mass and spring modulus of the elastic member 108. The frequency characteristic 313 has a flat characteristic in a band 315 extending from a resonant frequency f3 which is obtained from the mass of the opening member 110 and the spring modulus of the elastic support member 109, to the resonant frequency f2.

Referring to FIG. 12C, reference sign 316 denotes a frequency characteristic of the elastic member 108 (i.e., frequency characteristic of the weight 108*a*) shown in FIG. 11B for the input to the casing 101. The frequency characteristic 316 has a response characteristic that is attenuated in a band of the resonant frequency f3 or higher, the resonant frequency f3 which is obtained from the mass of the opening member 110 and the spring modulus of the elastic support member 109. That is, even if the vibration that becomes the casing propagation noise propagates to the casing 101, the elastic support member 109 and the opening member 110 serve as a vibration isolation table. Hence, the casing propagation noise to the elastic member 108 can be reduced. As the resonant frequency f3 obtained from the spring modulus of the elastic support member 109 and the mass of the opening member 110 is lowered, the band of the frequencies whose vibration can be isolated can expand. To attain this, for example, the spring modulus of the elastic support member 109 may be further decreased, and the mass of the opening member 110 may be further increased.

Referring to FIGS. 12B and 12C, with the model shown in FIG. 11B, that is, with the configuration as shown in FIGS. 10A and 10B, the vibration due to the casing propagation vibration hardly affects the elastic member 108. The casing propagation noise is less likely collected by the microphones. Referring to FIG. 12C, the elastic member 108 makes substantially no response to the vibration with the resonant frequency f3 or higher included in the casing propagation vibration. Thus, the vibration due to the casing propagation vibration hardly affects the elastic member 108. Referring to FIG. 12B, the frequency characteristic has the flat response characteristic for the audio vibration in the range from the resonant frequency f3 to the resonant frequency f2.

Thus, the vibration due to the casing propagation noise is less likely transmitted to the elastic member 108, whereas the response can be made to the audio vibration. It is ideal to determine the resonant frequency f3 to 20 Hz or lower.

As described above, in the fourth embodiment, the microphone 106*b*, the opening member 110 for the microphone 106*b*, and the elastic member 108 are elastically supported by the elastic support member 109 with respect to the casing 101. With this configuration, the casing propagation noise generated when the casing 101 is vibrated, such as the touch noise which may be mixed if the configuration of the first embodiment is used, can be reduced.

Figure 13A:
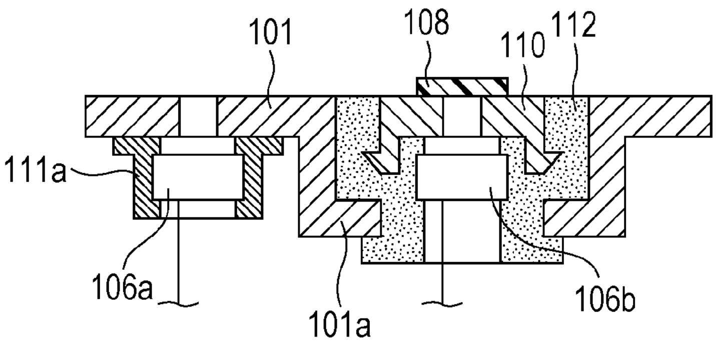
FIG. 13A illustrates another arrangement of microphones according to the fourth embodiment.
Figure 13B:
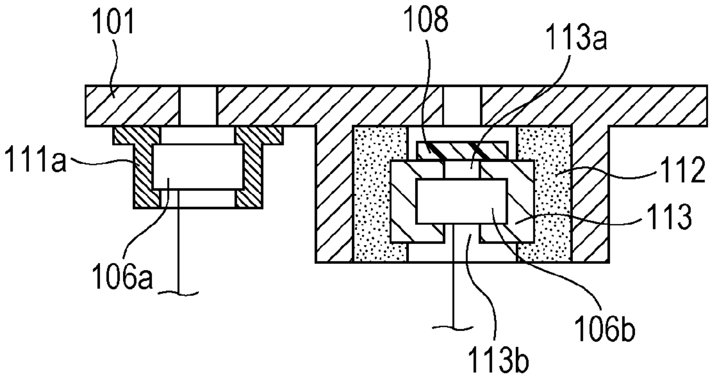
FIG. 13B illustrates still another arrangement of microphones according to the fourth embodiment.
Figure 13C:
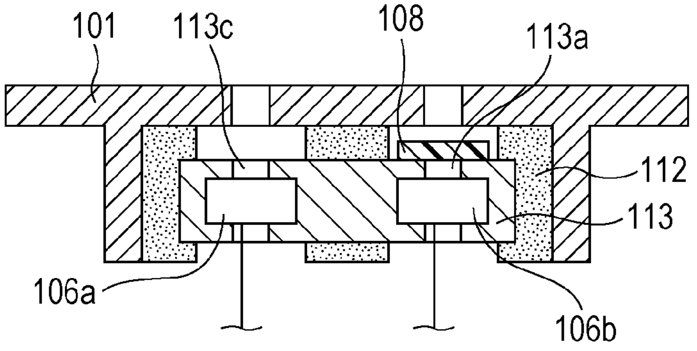
FIG. 13C illustrates yet another arrangement of microphones according to the fourth embodiment.

Alternatively, configurations shown in FIGS. 13A to 13C may be used. FIGS. 13A to 13C illustrate the configuration around the microphones 106*a* and 106*b* and the elastic members 108 according to the fourth embodiment. Other configuration is similar to that of the first embodiment.

FIG. 13A will be described first. A microphone support member 111*a* elastically supports a microphone 106*a*. An opening member 110 has an opening for a microphone 106*b*. An elastic member 108 is arranged at the opening of the opening member 110 to prevent the air from entering through the opening. A microphone-unit elastic support member 112 elastically supports the microphone 106*b* and the opening member 110 with respect to the casing 101, and is formed of an elastic material with a low hardness, such as an elastomer, rubber, or gel.

This configuration differs from the configuration shown in FIGS. 10A and 10B in that the microphone-unit elastic support member 112 serves as the elastic support member 109 and the microphone support member 111*a*. Accordingly, the number of parts can be reduced. The microphone-unit elastic support member 112 is fitted to a recessed portion 101*a* provided at the casing 101. An end of the opening member 110 is folded to prevent the opening member 110 from being removed. The microphone-unit elastic support member 112 is fitted to the opening member 110. With this configuration, the number of parts can be reduced while the advantage similar to that of the configuration in FIGS. 10A and 10B is provided. Hence, the cost is reduced, and assembling becomes easy.

Next, FIG. 13B will be described. The same reference signs are applied to functions similar to those shown in FIG. 13A, and the redundant description will be omitted. A microphone rigid support member 113 including a microphone 106*b* is a rigid member made of, for example, metal. The microphone rigid support member 113 has an opening 113*a* for collecting a sound by the microphone 106*b*, and an opening 113*b* for wiring of the microphone 106*b* at a position opposite to the opening 113*a*. An elastic member 108 is arranged at the opening 113*a* to prevent the air from entering through the opening. FIG. 13B differs from FIG. 13A in that the microphone rigid support member 113 having the opening 113*a* is elastically supported to the casing 101. As compared with the opening member 110 shown in FIGS. 10A and 10B, and 13A, the weight of the member at which the elastic member 108 is arranged can be easily increased. Thus, the resonant frequency f3 shown in FIG. 12B can be arranged in a low frequency region.

Next, FIG. 13C will be described. The same reference signs are applied to functions similar to those shown in FIG. 13B, and the redundant description will be omitted. FIG. 13C differs from FIG. 13B in that a microphone rigid support member 113 includes microphones 106*a* and 106*b*. An elastic member 108 is arranged at an opening 113*a* for the microphone 106*b*, whereas an elastic member 108 is not arranged at an opening 113*c* for the microphone 106*a*. Accordingly, the weight of the member at which the elastic member 108 is arranged can be easily increased. Also, the two microphones 106*a* and 106*b* can be formed as a unit, and hence assembling becomes easy. Further, the casing propagation vibration directly transmitted to the microphone 106*a* can be reduced like the configuration described with reference to FIG. 12C. Cables of the microphones 106*a* and 106*b* extend from the rear surface of the audio collecting unit. Alternatively, the microphones 106*a* and 106*b* may be directly mounted on a mount board.

In this embodiment, for the convenience of the description, the part different from the first embodiment has been described. However, the structure around the microphone 106*b* in this embodiment may be applied to the second or third embodiment. Accordingly, the elastic member 108 can be prevented from being vibrated due to the casing propagation vibration, such as the touch noise which is generated when the user touches the casing of the image pickup apparatus. The noise resulted from the vibration of the casing can be reduced.

Fifth Embodiment

In the above embodiments, the image pickup apparatus has been described. However, any apparatus may be used as long as the apparatus includes a built-in microphone unit and hence can record a sound, and the apparatus can record an audio signal from an external microphone unit. For example, a personal computer, a cellular phone, or an IC recorder may be used. Any of the above-listed apparatuses may be used as long as the apparatus includes a connection terminal for reception of the audio signal from the external microphone unit, and includes the built-in microphone unit.

The embodiments of the present invention can be implemented even by supplying a system or an apparatus with a storage medium storing program codes of software that provides the functions of the embodiments. A computer (or CPU or MPU) in the system or the apparatus supplied with the storage medium reads and execute the program codes stored in the storage medium.

In this case, the program codes read from the storage medium serve as the functions of the embodiments. Therefore, the program codes and the storage medium storing the program codes configure the present invention.

The storage medium for supplying the program codes may be, for example, a flexible disk, a hard disk, an optical disc, a magneto-optical disk, a CD-ROM, a CD-R, a magnetic tape, a non-volatile memory card, or a ROM.

Also, a case is also included in the present invention, the case in which an OS (basic system or operating system) running on the computer performs part of or all processing on the basis of instructions given by the program codes, and the functions of the embodiments are provided by the processing.

Further, a case is also included in the present invention, the case in which the program codes read from the storage medium are written in a memory provided in a function expansion board inserted into the computer or provided in a function expansion unit connected with the computer, and the functions of the embodiments are provided. In this case, a CPU or the like provided in the function expansion board or the function expansion unit executes part of or all actual processing on the basis of instructions given by the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-284576, filed Dec. 15, 2009, which is hereby incorporated by reference herein in its entirety.

The invention claimed is:

1. An audio processing device including a first audio collecting unit configured to convert an audio vibration into an electric signal and acquire an audio signal, comprising:

a shielding unit having a predetermined resonant frequency that shields the first audio collecting unit from an influence of airflow outside the device; and an acquiring unit configured to acquire, as a first audio signal, an audio signal in a predetermined frequency band lower than the resonant frequency of the shielding unit from among the audio signal acquired by the first audio collecting unit that is shielded from the influence of the air flow outside the device by the shielding unit.

2. The audio processing device according to claim 1, wherein the predetermined frequencies for the acquiring unit are lower than the resonant frequency of the shielding unit and higher than a frequency band having a predetermined or higher sensitivity to a wind noise when the first audio collecting unit is not shielded.

3. The audio processing device according to claim 1, wherein the predetermined frequencies for the acquiring unit are lower than the resonant frequency of the shielding unit and higher than frequencies including a noise by a predetermined amount or larger, the noise which is generated in the audio signal acquired by the first audio collecting unit by the influence of the airflow outside the device when the first audio collecting unit is not shielded.

4. The audio processing device according to claim 1, further comprising:

a second audio collecting unit configured to convert an audio vibration into an electric signal and acquire an audio signal, wherein the acquiring unit acquires an audio signal, in which the first audio signal is combined with the audio signal acquired by the second audio collecting unit.

5. The audio processing device according to claim 4, further comprising:

a third audio collecting unit configured to convert an audio vibration into an electric signal and acquire an audio signal, wherein the acquiring unit acquires an audio signal, in which the first audio signal is combined with the audio signal acquired by the second audio collecting unit, and an audio signal, in which the first audio signal is combined with the audio signal acquired by the third audio collecting unit.

6. The audio processing device according to claim 5, wherein positions of the first audio collecting unit and the third audio collecting unit are located within a predetermined distance in a horizontal direction or a vertical direction of the audio processing device, and wherein the predetermined distance allows a phase difference between the first audio signal and the audio signal acquired by the third audio collecting unit to be within 90 degrees in the predetermined frequency band.

7. The audio processing device according to claim 5, wherein the acquiring unit compares the audio signal acquired by the second audio collecting unit and the audio signal acquired by the third audio collecting unit with each other, and delays the first audio signal in accordance with the comparison result and the position of the first audio collecting unit.

8. The audio processing device according to claim 4, wherein positions of the first audio collecting unit and the second audio collecting unit are located within a predetermined distance in a horizontal direction or a vertical direction of the audio processing device, and wherein the predetermined distance allows a phase difference between the first audio signal and the audio signal acquired by the second audio collecting unit to be within 90 degrees in the predetermined frequency band.

9. The audio processing device according to claim 1, further comprising a reducing unit configured to reduce a vibration of the shielding unit due to a vibration of a device body of the audio processing device.

10. The audio processing device according to claim 9, wherein the reducing unit includes a mount member at which the shielding member is provided, and an elastic member, the mount member being arranged between the elastic member and a casing of the audio processing device.

11. The audio processing device according to claim 10, wherein the reducing unit reduces a vibration with a frequency based on a mass of the mount member and an elastic modulus of the elastic member.

12. The audio processing device according to claim 1, further comprising an output unit configured to selectively output the first audio signal and the audio signal acquired by the second audio collecting unit.

13. The audio processing device according to claim 1, further comprising an output unit configured to alternately output the first audio signal and the audio signal acquired by the second audio collecting unit.

14. An audio processing device including a first microphone capable of reducing a wind noise and a second microphone incapable of reducing a wind noise, comprising:

a shielding unit configured to shield the first microphone from an influence of airflow outside the device and having a predetermined resonant frequency;

a first extracting unit configured to extract an audio signal in a first frequency band lower than the resonant frequency of the shielding unit from among the audio signal acquired by the first microphone;

a second extracting unit configured to extract an audio signal in a second frequency band higher than the predetermined resonant frequency from among the audio signal acquired by the second microphone; and an acquiring unit configured to acquire an audio signal, in which the audio signal acquired by the first extracting unit is combined with the audio signal acquired by the second extracting unit.

15. The audio processing device according to claim 14, wherein positions of the first microphone and the second microphone are located within a predetermined distance in a horizontal direction or a vertical direction of the audio processing device, and wherein the predetermined distance allows a phase difference between the audio signal acquired by the first microphone and the audio signal acquired by the second microphone to be within 90 degrees in the first frequency band.

16. The audio processing device according to claim 14, further comprising a reducing unit configured to reduce a vibration of the shielding unit due to a vibration of a device body of the audio processing device.

17. The audio processing device according to claim 16, wherein the reducing unit includes a mount member at which the shielding member is provided, and an elastic member, the mount member being arranged between the elastic member and a casing of the audio processing device.

18. The audio processing device according to claim 17, wherein the reducing unit reduces a vibration with a frequency based on a mass of the mount member and an elastic modulus of the elastic member.

* * * * *